Figure 1:
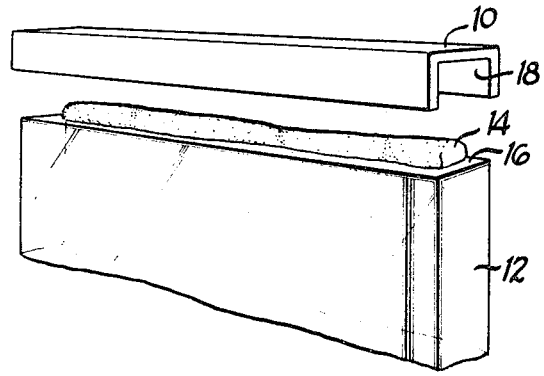

May 13, 1969     H. J. SHOCKEY     3,444,023

METHOD FOR BEDDING PANELS INTO FRAMES

Filed March 16, 1966

Inventor:
HOWARD J. SHOCKEY
By Wilson, Settle, Batchelder,
ATT'YS. & Craig

United States Patent Office 3,444,023
Patented May 13, 1969

3,444,023
METHOD FOR BEDDING PANELS INTO FRAMES
Howard J. Shockey, Elkhart, Ind., assignor to Excel Corporation, Elkhart, Ind., a corporation of Indiana
Filed Mar. 16, 1966, Ser. No. 534,910
Int. Cl. B29d 23/04; B29c 17/14, 27/16
U.S. Cl. 156—293   9 Claims This application is related to a co-pending application of Robert J. Deisenroth, Ser. No. 222,590, filed on Sept. 10, 1962, now U.S. Patent No. 3,263,014, and assigned to the present assignee.

This invention relates to methods of bedding a panel into a frame, and more particularly to a method of bedding in which bedding material for bonding the panel to the frame is formed into a tubular mass having a liquid core and a solid membrane surrounding and encasing the core so that the mass of bedding material may be handled as a unit in placing it between the panel and the frame.

Although the utility of the present invention is not restricted to a specific application, the invention is particularly useful in bedding the glass of automobile windows into frames. It is well known that the glass of an automobile window frequently has a frame member extending along at least one edge of the glass and in some cases more than one edge is framed. One of the known and rather commonly used methods of bedding glass panels into frames involves the use of strips of uncured rubber material. A worker folds a rubber strip over the edge of the window and then inserts the edge with the folded-over rubber into a channel-shaped frame. Any excess rubber material is trimmed off with a hot knife, and the window is ordinarily cleaned before the bedding process is completed. Any variations in glass thickness can be compensated for by using different thicknesses of rubber. The whole operation is carried out by hand, and it is evident that this manual method has relatively high labor costs. It has other disadvantages too; for example, the rubber strips do not hold up well with weathering, the process is relatively messy, and tapes of different thicknesses must be used to compensate for variations of glass thickness.

A bedding method has been proposed wherein the bedding material is initially injected between the frame and the panel as a liquid and is subsequently cured to a solid state to form a permanent bedding for the panel. This method automatically compensates for variation in glass thickness, does not require trimming and is a clean procedure and does not require washing or other cleaning of the glass and frame assembly. A method of this type is described in a co-pending application of Robert J. Deisenroth, Ser. No. 222,590, filed Sept. 10, 1962 which has matured into the above-mentioned U.S. Patent No. 3,263,014, and is assigned to the assignee of this application. Reference may be made to the Deisenroth patented application for detailed information on the method.

In spite of the many advantages of the method of the co-pending application over the method using rubber strips, the former method does have some drawbacks. The edges of the frame member must be sealed before the liquid material is injected into the space within the frame member. The material is injected in liquid condition, and care must be exercised to keep the liquid from spilling or running over onto the apparatus involved in the operation.

The invention now proposes a method of bedding wherein instead of injecting liquid bedding material between a glass panel and a metal frame, the bedding material is first treated so that a mass of the bedding material may be handled as a unit and may be placed either manually or by machine on the edge of the panel or on a surface of the frame so that the bedding material is between the panel and the frame when they are assembled. As a preliminary step, a mass of bedding material is formed into a tubular shape and is heated sufficiently to partially cure material at its surface and thereby form a tough, elastomeric membrane surrounding and encasing a core of liquid bedding material. This membrane encased mass may be placed on an edge of the panel, and the panel edge is then inserted into the frame thus squeezing the bedding material into a limited space between the panel edge and the frame. The bedding material is heated, as by placing the frame and panel assembly in an oven, so as to cure the whole mass of bedding material to a solid form in which it is adherent to the glass panel and to the metal frame and forms a solid, resilient bed for the panel in the frame. The method of the invention does not require that the edges of the frame be sealed to prevent escape of liquid material. By encasing the liquid bedding material in a membrane, the mass of bedding material can be handled satisfactorily without as much chance of it running over or spilling from the apparatus.

Accordingly, it is an object of the present invention to provide a method of bedding a panel into a frame by means of a mass of bedding material having a liquid core surrounded and encased by a membrane of partially cured bedding material.

Another object of the invention is to form a mass of bedding material with a liquid core and a surrounding membrane by a molding and heating procedure.

A further object of the invention is to so place a membrane encased mass of liquid bedding material relative to a frame and a panel as to squeeze the mass of bedding material between the panel and the frame when a marginal edge of the panel is inserted into the frame in an assembly step.

Other objects of this invention will appear in the following description and appended claims, reference being had to the accompanying drawings forming a part of this specification wherein like reference characters designate corresponding parts in the several views.

Figure 2:
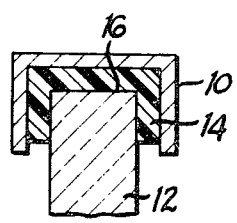
Figure 3:
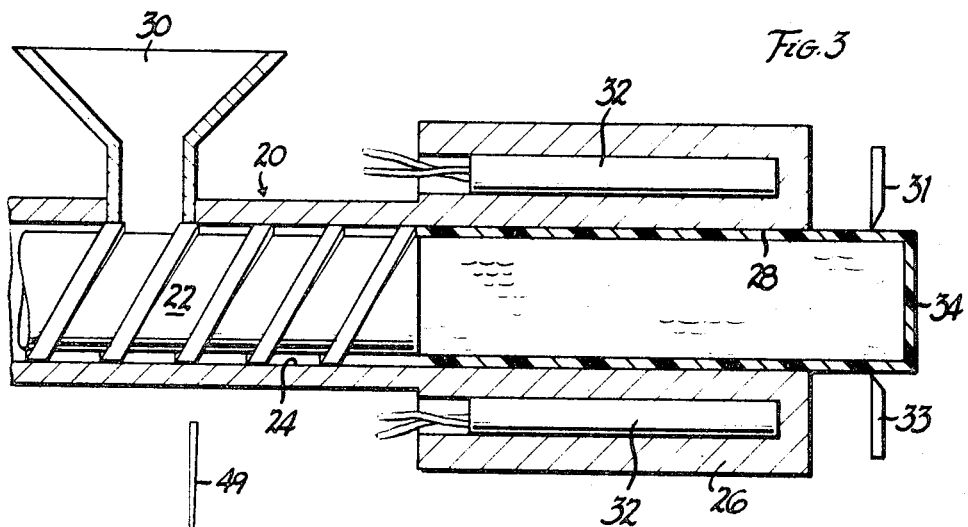
Figure 4:
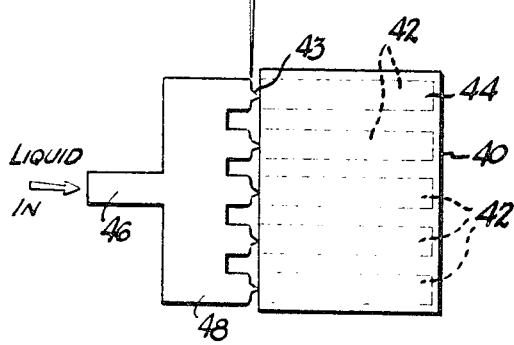

On the drawings:
FIGURE 1 is a fragmentary perspective view of a frame and panel as they might be positioned for assembly, and a tubular mass of membrane encased bedding material lying on an edge of the panel ready to be inserted into the frame;
FIGURE 2 is a sectional view of the panel, frame and bedding material after they have been assembled;
FIGURE 3 is a schematic sectional view of an extruder for forming a tubular mass of bedding material with an encasing membrane and a liquid core; and
FIGURE 4 is a schematic plan view of casting apparatus which may alternatively be employed to form a membrane encased mass of bedding material.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:
Referring first to FIGURE 1, there is shown a channel-shaped frame member 10 positioned above a glass panel 12 which is to be bedded into the frame member. An elongated tubular mass 14 of bedding material is lying on the top edge 16 of glass panel 12 in a position where it can be inserted into the recess 18 of the frame member 10 by inserting the edge 16 of the panel into the frame member. There is sufficient bedding material in the tubular mass 14 to fill up the space remaining between the panel member 12 and the frame member 10 after the edge of the panel has been inserted into the frame.

The tubular mass 14 of bedding material has a core of liquid bedding material surrounded and encased by a solid outer membrane of partially cured bedding material. The outer membrane holds the core of liquid bedding material therein and keeps it from running. A preliminary molding operation is carried out in order to form the tubular mass 14 of bedding material. One such molding operation is illustrated schematically in FIGURE 3. The apparatus 20 shown in FIGURE 3 is an extruder which includes an extruder screw 22 mounted for rotation in a barrel 24 and a block 26 which has a cylindrical passage or bore 28 extending through the same and communicating at one end with the barrel 24. Bedding material is supplied to the barrel 24 through a feed hopper 30 which communicates with the space within the barrel 24. The extruder screw 22 advances the material through the barrel 24 into passage 28 of block 26 and continues forcing the material to the right through passage 28.

The block 26 is heated as by means of cartridge heaters 32 mounted in the block. Heat is transferred from the block 26 to the liquid bedding material as it moves through passage 28. This heat is sufficient to partially cure a layer of the bedding material at its surface to form a membrane 34 encasing a central core of liquid material. As the membrane encased bedding material emerges from passage 28 it passes through cutting blades 31 and 33 represented schematically in FIGURE 3. When a sufficient length of membrane encased bedding material has been extruded out of the extruder 20, the cutting knives cut off that length. The cutting knives are heated so that as they cut across the tubular mass of bedding material, they form a membrane at the cut ends of the tubular mass such that the membrane 34 completely surrounds and encases the inner core of liquid bedding material.

An alternate way of carrying out the molding operation for forming the tubular mass 14 of bedding material is illustrated schematically in FIGURE 4. This operation is a casting operation wherein liquid bedding material is cast in a heated mold 40 having elongated semi-cylindrical mold cavities 42 and a top mold structure 44 also having semi-cylindrical mold cavities which register with cavities 42 so as to form cylindrical mold cavities therewith. Liquid bedding material is introduced into the mold 40 through an inlet 46 and flows through a passage 48 into the five mold cavities 42. The mold structure 40 is heated such that the material at the surface of the fluid in the mold cavities is partially cured to a solid condition and thus forms a membrane encasing the underlying liquid material. The passage 48 narrows down to orifices 43 at the inlets to the five cavities 42. After the liquid bedding material has been supplied to the cavities 42, the passage 48 and inlet 46 is moved to the left away from the mold cavities. A hot knife 49 is then moved down to sever any connecting strands of bedding material and to separate the material in cavities 42 from the material in passage 48. Thus, the tubular masses are made ready for assembly with a panel and frame in the manner illustrated in FIGURE 1.

After a tubular mass of membrane encased liquid bedding material has been formed, the next step is to place the tubular mass 14 in a position where it will be squeezed between the panel 12 and the frame member 10 when they are assembled. The tubular mass 14 may simply be placed on the top edge of panel 12 as shown in FIGURE 1. Alternatively, the frame member 10 can be inverted so that its recess 18 faces upward, and the tubular mass 14 may then be placed on the bottom inside surface of the frame member 10. In this case, the panel 12 may be inserted downward into the frame member 10.

FIGURE 2 shows the assembly after the edge 16 of panel 12 has been inserted into the frame member 10. It may be seen that the bedding material 14 is squeezed between panel 12 and frame member 10 and is forced to flow so as to fill the U-shaped space between panel 12 and frame 10. The membrane surrounding mass 14 of bedding material is distorted when the bedding material is squeezed between the panel and the frame, and the membrane may burst as a result of this squeezing. Although the inner liquid material is released from the membrane whenever it bursts, the spacing between the panel 12 and the frame 10 is so small and the friction forces exerted on the liquid material are great enough that the liquid material does not flow or run out of the frame member 10.

After the panel has been fully inserted into the frame 10, the bedding material 14 is cured to a solid form as shown in FIGURE 2 by heating the bedding material at a curing temperature which may be 300° F. for example. One satisfactory way of accomplishing this heating is to place the assembly in an oven maintained at the desired temperature and leave the assembly in the oven long enough to cure the liquid bedding material to a solid form. The solid bedding material is strongly adherent to both the glass panel 12 and the metal frame member 10 and provides a firm but resilient bed for the panel in the frame.

The bedding material may be any suitable thermosetting or thermoplastic material which has the following properties:

(1) Resiliency—to provide a suitable bedding for the glass.

(2) Adherence—to provide a bond between the glass and metal frame.

(3) Curability—to a solid state in a relatively short time by the application of heat, for example, within about 45 seconds at about 250° F.

(4) Resistance to weathering (sunlight, temperature changes and moisture absorption).

(5) Mechanical properties such as tensile strength, compressive strength, impact resistance and toughness sufficient to withstand the stress normally encountered in use of the final assembly.

One class of resins suitable as bedding materials are the polyurethane resins. Polyurethane resins are obtained by the reaction of polyisocyanates with organic compounds containing two or more active hydrogen atoms to form polymers having free isocyanate groups. Under the influence of heat, the free isocyanate groups react to form a thremosetting material. A suitable thermosetting form may be prepared from castor oil and a triisocyanate. A suitable thermoplastic material is polyvinyl resin.

Referring again to FIGURE 1, it may in some cases be desirable to dam the ends of the frame member 10 to assure positively that no liquid bedding material can flow out the ends of the frame. For this puropse, rigid, resilient or pliable bodies of damming material may be inserted into the frame 10 so that they extend crosswise of the recessed surfaces 18 and thus seal the ends of the frame. The use of such dams is not essential to the invention, but they may be used if desired.

The invention thus facilitates the handling of liquid bedding material in a bedding process by providing a tough membrane of partially cured bedding material which completely surrounds and encases the liquid bedding material. This membrane is flexible enough to be deformed easily when the bedding material is squeezed between a panel and the frame in which the panel is mounted. Thus, the bedding material will conform easily to the surface of a frame member and to the surface of the panel and so fill the space between the panel and the frame. It is not necessary to seal the edges of the frame member.

I claim:

1. A method of bedding a panel into a frame member comprising the steps of forming a tubular mass of bedding material having a liquid core and a solid membrane surrounding and encasing said liquid core, placing said tubular mass of bedding material between a marginal edge of said panel and a frame member having a recess in which said panel is to be bedded, said bedding material being curable by heat to a solid form wherein it is adherent to said panel and said frame member, inserting said marginal edge of said panel into said recess of said frame member with said tubular mass of bedding material contacting said panel edge and the surface of said frame member within said recess, and heating the bedding material in said frame member to cure the same to a solid form throughout and thereby bond the bedding material to said panel member and to said frame member to provide a bed for said panel in said frame member.

2. The method of claim 1 wherein said tubular mass of bedding material is formed by molding bedding material and heating the material to partially cure a membrane layer thereof at the surface of the bedding material.

3. The method of claim 2 wherein said molding is accomplished by extrusion of bedding material into a tubular mass.

4. The method of claim 2 wherein said molding is accomplished by casting of liquid bedding material into a tubular mass.

5. The method of claim 1 wherein said step of placing said tubular mass of bedding material between a marginal edge of a panel and a frame member is carried out by placing said tubular mass directly on the marginal edge of the panel followed by insertion of said panel edge into said recess.

6. The method of claim 1 wherein said step of placing said tubular mass of bedding material between a marginal edge of a panel and a frame member is carried out by placing said tubular mass directly on the surface of said frame member forming said recess followed by insertion of said panel edge into said recess.

7. The method of claim 1 wherein by inserting said marginal edge of said panel into said frame member with said tubular mass of adhesive material between and in contact with said frame member and said panel edge, the membrane of said tubular mass is distorted and bursts, thus allowing the bedding material to fill the space between said panel edge and said frame member.

8. The method of claim 7 wherein said frame member is channel-shaped in section and said bedding material substantially fills the same along the leg portions thereof as well as the base portion.

9. A method of bedding a panel into a frame member having a recess to receive a marginal edge of said panel comprisng the steps of forming a tubular mass of bedding material having a liquid core and a solid flexible membrane surounding and encasing said liquid core, said bedding material being curable by heat to a solid form wherein it is adherent to said panel and to said frame member, placing said tubular mass of bedding material on a marginal edge of said panel and extending lengthwise along said marginal edge, inserting said marginal edge of said panel into said recess of said frame member, thereby bringing said bedding material into contact with the surface of said frame member and causing said bedding material to flow and substantially fill a space between said panel edge and said frame member, and heating the bedding material in said frame member to cure the same to a solid form throughout and thereby bond the bedding material to said panel member and to said frame member to provide a bed for said panel in said frame member.

References Cited
UNITED STATES PATENTS

| | | | |
|---|---|---|---|
| 2,199,425 | 5/1940 | Waring | 264—210 X |
| 2,768,475 | 10/1956 | Seelen et al. | 156—109 X |
| 2,938,237 | 5/1960 | Kern et al. | 156—245 X |
| 3,008,862 | 11/1961 | Haine et al. | 156—244 |
| 3,098,698 | 7/1963 | Glynn | 264—261 |
| 3,108,443 | 10/1963 | Schuermann et al. | 61—45 |
| 3,226,457 | 12/1965 | Smith | 264—214 X |
| 3,272,900 | 9/1966 | Ryan et al. | 264—261 X |
| 3,293,977 | 12/1966 | Dalton et al. | 85—37 |

HAROLD ANSHER, *Primary Examiner.*

U.S. Cl. X.R.

156—295; 264—4, 176, 210, 216, 323, 331